Patented Dec. 6, 1949

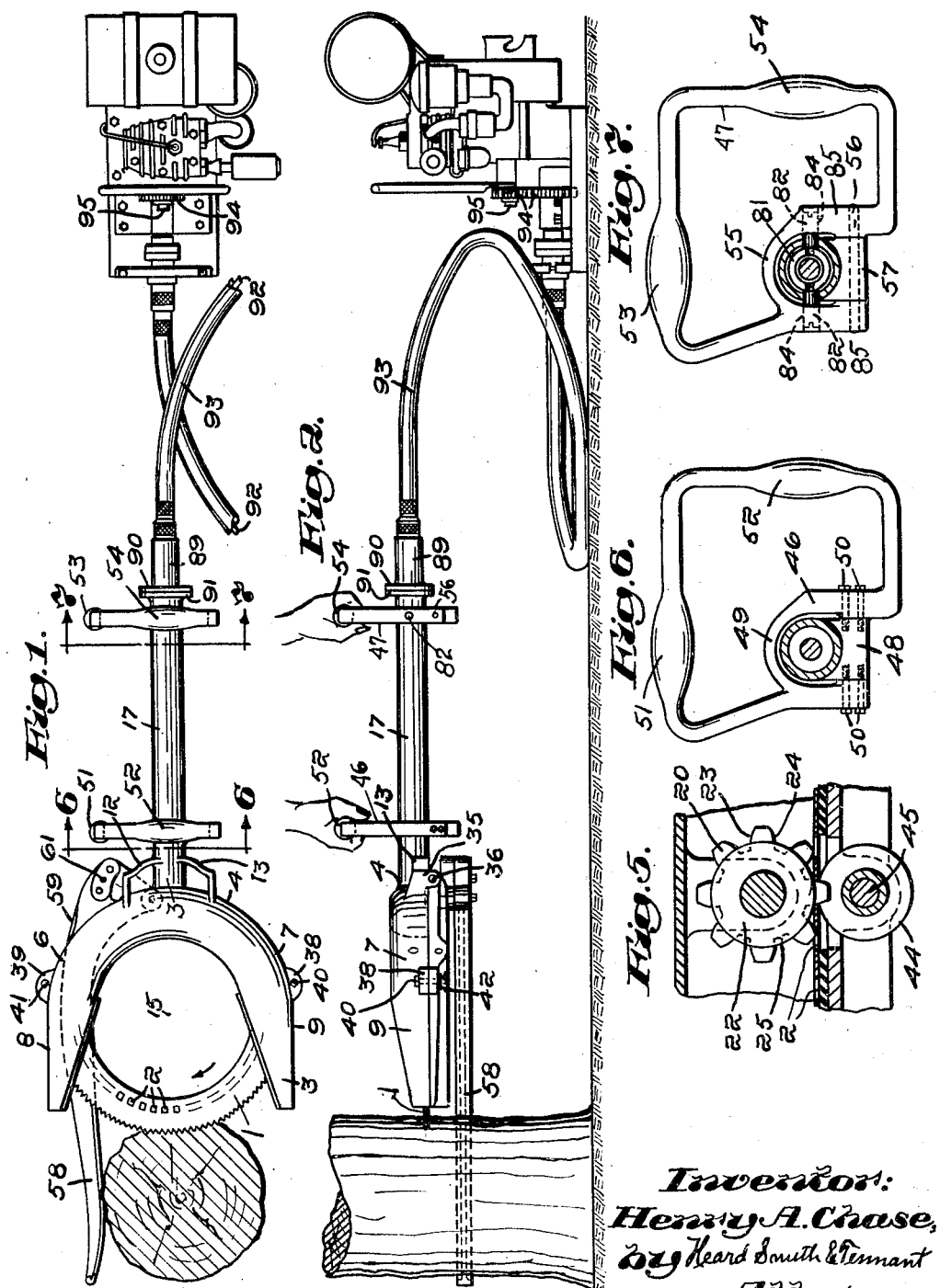

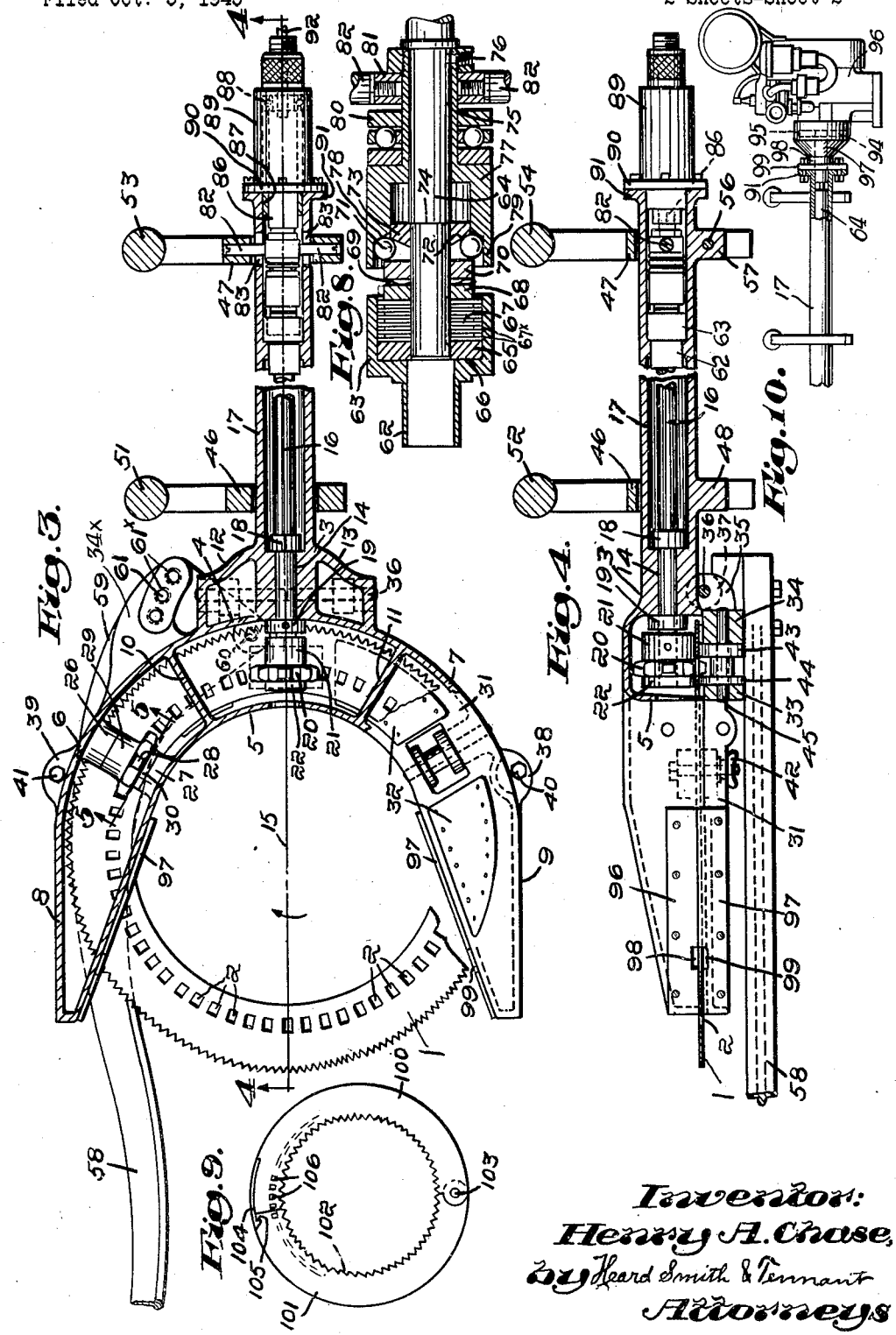

2,490,255

UNITED STATES PATENT OFFICE 2,490,255

PORTABLE POWER ACTUATED RIM-DRIVEN ANNULAR SAW

Henry A. Chase, Newtonville, Mass., assignor to Cummings Machine Works, Boston, Mass., a corporation of Massachusetts Application October 5, 1945, Serial No. 620,431

6 Claims. (Cl. 143—44)

This invention relates to power actuated circular saws adapted for general use but particularly to portable saws for felling and trimming trees and cutting the wood thereof into suitable lengths, and the general object of the invention is to provide a saw of simple and economical construction which is adapted for these and other uses.

More particularly the object of the invention is to provide a portable saw of light weight which can be easily handled and readily positioned by an operator horizontally, vertically, or any desired angle relatively thereto so that, for example, a woodsman can cut a horizontal slot in one side of a standing tree, then cut a slot inclined thereto to provide a notch or kerf and finally to cut a slot in the opposite side of said tree so that the tree will fall in the direction of the notch or kerf and which may thereafter be so positioned as to enable the limbs of the tree to be readily severed from the trunk irrespective of the direction in which they project from the trunk, and finally to enable the trunk and limbs to be cut into suitable lengths.

Another object of the invention is to provide a circular saw comprising an annular blade having means engaging the saw blade intermediate of its width for driving the saw and having means for maintaining the saw accurately in its plane of rotation, and means for resisting the thrust of the saw blade during the cutting operation thereof.

Another object of the invention is to provide a portable circular saw of the character described having a frame provided with separable means or sections to enable removal and replacement of the saw blade.

More specifically one of the objects of the invention is to provide a circular saw comprising a flat annular saw blade, a frame having a head with oppositely extending arcuate arms surrounding a substanial segment of the blade and having complementary supporting means engaging one face of the segment of the blade with suitable spaced rotatable members mounted in said frame engaging the opposite face of said segment of the blade in a circular zone intermediate of its width acting in cooperation with the suporting means to maintain the blade accurately in its plane of rotation, means for driving one of said rotatable members and complementary interengaging means on said rotatable members and the circular zone of the saw engaged thereby for rotating the saw blade and provided with means for resisting the force of the saw during its cutting operation.

A further object of the invention is to provide a circular saw construction comprising a flat annular saw blade having a circular series of uniform narrowly spaced gear teeth receiving recesses intermediate of its width, an arcuate frame enclosing a substantial segment of the blade having supporting means engaging one face of said segment of the blade, a driving gear, and gears oppositely spaced therefrom mounted on said frame to rotate respectively about axes radial with respect to the axis of rotation of the blade and provided with gears engaging the recesses of said blade operable to rotate the blade and to counteract the force of thrust of the blade during the cutting operation.

A further object of the invention is to provide a portable motor operated saw with means for supporting the saw and thrusting it against the work having means operable by a hand of the operator when so supported to cause actuation of the saw or to permit discontinuation of such actuation.

These and other objects and features of the invention will more fully appear from the following description and the accompanying drawings and will be particularly pointed out in the claims.

A preferred embodiment of the invention is illustrated in the accompanying drawings, in which, Fig. 1 is a plan view of the saw embodying the invention in the act of severing a tree or log and illustrating an internal combustion motor adapted to drive the saw through a flexible shaft, a section of which is broken off to show that it can be of any desired length;

Fig. 2 is a side elevation of the saw and driving mechanism illustrated in Fig. 1 in the act of felling a tree;

Fig. 3 is a plan view of the annular saw blade supported in an arcuate frame, the upper portion of which and the handle member extending therefrom is shown in horizontal section with the upper portion of one of the arcuate arms of the frame and the saw therebeneath broken away to show the mechanism for supporting the under side of the saw blade;

Fig. 4 is a view mainly in vertical section on line 4—4 Fig. 3;

Fig. 5 is a detail vertical sectional view on line 5—5 Fig. 3 showing an idle gear and cooperative mechanism for maintaining the saw accurately in the plane of its rotation and counteracting the force of thrust of the saw during the cutting operation, the construction illustrated in this figure being applicable also to the driving gear and to the companion idle gear;

Fig. 6 is a vertical sectional view on line 6—6 Fig. 1; and,

Fig. 7 is a vertical sectional view on line 7—7 Fig. 1;

Fig. 8 is an enlarged detail view of the clutch mechanism; and,

Fig. 9 is a detail view of an alternative internally toothed saw.

Fig. 10 is a detail view illustrating the manner in which a motor for driving the saw is mounted directly upon the end portion of the handle member.

The mechanism illustrated in the drawings comprises a flat circular annular saw blade 1 having peripheral teeth and intermediate of its width a circular series of uniformly spaced narrow approximately rectangular recesses 2 adapted to be engaged by the teeth of a suitable driving gear the inner edge walls of the recesses being substantially concentric with the axis of rotation of the saw blades. The blade is mounted in an arcuate frame surrounding a substantial segment of the blade and having means engaging one face of the blade and a complementary saw supporting member having means engaging the opposite face of the blade, said frame and blade supporting member having cooperating means maintaining the blade accurately in its plane of rotation and means for resisting the thrust of the saw during the cutting operation. The frame comprises a head 3 provided with an outer vertical wall 4 concentric with the axis of rotation and an inner wall 5 also concentric with said axis of rotation surrounding a segment of the saw blade, with integral arcuate outwardly extending arms 6 and 7 terminating in tangential extensions 8 and 9 diverging outwardly. The walls 4 and 5 of the head and the extensions are connected by webs 10 and 11 (Fig. 3) to form a light but rigid frame construction. The head 3 desirably is of cored construction having oppositely extending webs 12 and 13 connecting a central preferably cylindrical portion of the head to the outer wall 4. The head 3 is provided with a bore 14 in radial alinement with the axis of rotation 15 of the saw blade forming a journal for a shaft 16 which extends outwardly in a radial direction with respect to the axis of rotation of the saw blade. The head has a rigid tubular extension 17 concentrically surrounding the shaft 16 forming a handle member by which the saw as a whole may be supported and applied to the work. For convenience in operation the handle member 17 is provided with suitable hand grips, hereinafter described, by means of which the saw may be manipulated to position the saw in any desired relation to the work and also utilized to force the saw blade against the work.

The driving shaft 16 has secured to it suitable collars 18 and 19 adapted to engage suitable shoulders in opposite ends of the journal 14. The driving shaft 16 has secured to it a gear 20 having a hub 21 which engages the adjacent face of the saw blade and a collar 22 upon the opposite side of the gear which likewise engages the face of the saw blade. The gear 20 is so constructed as to mesh with the recesses 2 in the saw and each tooth has substantially parallel walls 23 and 24 at the pitch line 25 which is tangential to the saw blade, the tooth converging therefrom to its flattened and rounded crown, as shown in Fig. 5. The end face of each tooth is complementary to the inner wall of the tooth engaging recesses of the saw blade and is adapted to resist the force of the thrust of the saw during its cutting operation. Similarly the opposite end of each tooth preferably has a face complementary to the outer wall of the tooth-engaging recesses.

Suitable means are provided for cooperating with the driving gear to maintain the saw accurately in its plane of rotation. In the preferred construction shown the frame is provided with bosses 26 and 27 spaced substantially less than 180° apart around the saw blade and preferably at suitably equal distances of 60° on opposite sides of the axis of rotation of the driving shaft. Thrust-resisting gears 28 having hubs 21 and collars 22 engaging the face of the saw blade are mounted on shafts journaled in said bosses in radial alinement with the axis 15 of rotation of the blade.

The complementary saw supporting member is provided with means cooperating with the driving and cooperating thrust-resisting gears and their hubs to maintain the blade accurately in its plane of rotation The supporting member as illustrated herein comprises an arcuate plate or frame section complementary to the contour of the frame above described having means to engage the other face of the saw and in cooperation with the hubs and collars 21 and 22 of the driving shaft and the hubs and collars 29 of the idle gears accurately to maintain the blade in its plane of rotation.

As illustrated herein the supporting member comprises an arcuate plate or frame section 31 which underlies the segment of the saw blade and desirably is provided with fibre wear plates 32 adapted to engage the adjacent surface of the blade. The plate 31 has upwardly extending spaced bosses 33 and 34 beneath the arcuate portion of the head of the frame with extensions 35 upon the bosses 33 and 34 which are pivotally mounted upon a shaft 36 the ends of which are secured in downwardly extending bosses 37 of the head 3 (Figs. 3 and 4). The plate 31 and the outer wall 4 of the arcuate arms are provided with outwardly extending lips 38 and 39 respectively which are connected by bolts 40 and 41 preferably provided with winged nuts 42 adapted when removed to permit the bolts to be withdrawn and the supporting plate 31 to be hingedly swung away from the frame for assemblage and removal of the saw blade therebetween.

By reason of this construction the supporting plate 31 is releasably attached to the frame in such manner to enable it to be swung downwardly to permit the assemblage of the saw within the frame and thereafter swung to the normal position illustrated in Fig. 2 to support the saw in its plane of rotation.

While the supporting member or frame section 31 may be provided in the preferred construction with any suitable means to cooperate with the hubs and collars on the driving shaft and cooperating thrust-resisting gears, suitable rollers 43 and 44 which are mounted in the supporting member or frame section 31 underlie respectively the hubs and collars upon these gears and are spaced apart sufficiently to permit the ends of the teeth of the respective gears to pass between them. The rollers 43 and 44 are respectively mounted upon shafts 45 in radial alinement with the axis of rotation of the saw blade.

By reason of this construction the rotation of the driving gear 20 rotates the saw blade about its axis of rotation 15. The cooperating hubs of the driving and idle gears and the rollers therebeneath maintain the saw accurately in its plane of rotation and the abutting of the inner edge walls of the respective recesses with the end faces of the teeth of the respective driving and cooperating gears resist the thrust of the saw as it is forced against the work. The saw frame is provided with suitable handle mechanism adapted to be utilized by the operator to support the saw and to thrust it against the work during the cutting operation. In the preferred construction this mechanism comprises the tubular handle member 17 which as above described encloses the driving shaft 16. The handle member 17 desirably is provided with suitably spaced hand gripping members 46 and 47. As illustrated herein the tubular handle member is provided with a downwardly extending integral boss 48 which is located in proximity to the head and the handle member 46 has a yoke-shaped portion 49 which is secured to the boss 48 by suitable bolts 50.

In the construction shown the hand gripping members are of general rectangular form and desirably are provided with enlarged grips 51 and 52 at right angles to each other. The other hand grip is of similar construction having hand grips 53 and 54 at right angles to each other but the arcuate portion 55 thereof is pivotally connected by a shaft 56 to a boss 57 extending downwardly from the handle member 17 and is provided with means for actuating a clutch for connecting the driving shaft of the saw to a shaft driven by a suitable motor.

By reason of the handle construction above described the operator while grasping the hand grips 51 and 53 may support the saw in horizontal position to produce a horizontal slot in a tree or other vertical piece of work or the saw may be relatively inclined to the horizontal to cut a notch or kerf in the tree which in cooperation with the horizontal cut will determine the direction in which the tree will be felled.

After the tree has fallen the operator may position the saw in vertical position to cut off the limbs which extend horizontally or by suitably manipulating the saw by the hand grips 51 and 53, or 52 and 54, position the saw in any desired angular relation to the limb to be severed or to cut the trunk of the tree at right angles to its axis whether the trunk is in horizontal position or at an inclination relatively thereto.

The spaced hand gripping members enable the operator not only to position the saw in different angular relation to the work but also enable the operator to press the saw blade against the work so that it will cut most effectively.

Inasmuch as the engagement of the rotating teeth of the saw with the work tends to move the entire saw and saw frame in a direction opposite to the direction of rotation of the saw, the saw frame is provided with guiding means to resist such movement. This is accomplished in the present invention by providing a guiding arm 58 which is mounted upon the saw-supporting plate 31 and extends along one of the arcuate arms a distance well beyond the periphery of the saw and which rests against the work and aids in supporting the saw during the cutting operation. In the preferred construction illustrated the guiding arm 58 has a triangular end portion 59 which underlies the saw-supporting plate 31 and is pivotally mounted adjacent its inner angle upon a bolt 60 which extends through the boss 34x projecting outwardly from the supporting plate 31. The guiding arm is adapted to be secured in adjusted positions toward and from the axis of rotation of the saw blade 15 by a bolt 61 inserted through a bolt hole in the arm and selectively through either of a series of bolt holes 61x in the laterally extending boss 34x of the saw-supporting member, thus enabling the guiding arm 58 to be so adjusted as most effectively to position the saw for cutting trees, limbs, etc., of different sizes.

Any suitable mechanism may be provided for transmitting power from a suitable motor to the driving shaft 16 and preferably comprises means operable by a hand of the operator while supporting the saw to control the rotation of the saw blade. For light saws an internal combustion motor, electric motor, or the like, may be mounted directly upon the end portion of the handle member 17 with means adapted to be operated by one of the hands of the operator which support the motor to control an electric circuit leading to the motor or to control clutch mechanism for releasably connecting a power driven clutch shaft to the driving shaft, or, particularly for heavy work, the clutch shaft may be driven by a flexible shaft of any desired length from a more powerful preferably portable motor.

One of the important features of the invention is to provide coupling means located within the tubular handle member operable by one of the hand grips for coupling and uncoupling the driving shaft 16 for the saw to a shaft which is driven by a suitable motor.

A preferred form of frictional clutch mechanism is shown in Figs. 3 and 4 of the drawings and in enlarged detail in Fig. 8.

The driving shaft 16, having the gear 20 which engages the circular series of recesses in the saw, has secured to its opposite end a sleeve 62 which is journaled in an internal bearing in the handle member and is provided with an enlarged cylindrical portion 63 into which an axially alined clutch shaft 64 extends. A ring 65, which fits within the cylindrical portion 63 and abuts against the shoulder 66 of said cylindrical portion, provides a bearing for the end of the clutch shaft 64. Alternating series of thin frictional disks 67 and 67x are slidably keyed respectively to the cylindrical portion 63 and to the clutch shaft 64 as in usual disk clutch constructions. The outermost disk is engaged by a ring 68 which is engaged by a cushion spring 69 in its turn engaged by a ring 70 which is slidably mounted upon the clutch shaft 64. The opposite face of the ring 70, which desirably is flat, is engaged by a circular series of balls 71 which are diametrically oppositely engaged by the inclined face 72 of a ring 73 which abuts a shoulder 74 upon an enlarged section of the clutch shaft 64. A sleeve 75, which is slidably feathered upon the shaft 64 in any suitable manner as by a screw 76 in a nut upon said sleeve having its end seated in a slot in the clutch shaft, permits longitudinal movement of the sleeve. The sleeve 75 is provided with a hollow enlarged cylindrical head 77 which slidably fits upon the ring 73 and is provided at its end with an inclined annular wall 78 which engages the balls 71. The head is also provided with a cylindrical lip 79 forming with the inclined wall 78 of the head and the inclined face 72 of the ring 73 a ball race for the balls 71. The construction is such that when the head 77 is forced longitudinally of the clutch shaft in the direction toward the work the inclined surface 77 will force the series of balls radially inwardly thereby forcing the clutch disks 67 and 67x in frictional engagement which will rotate the driving shaft. When however the head 77 is moved in the opposite direction the balls 71 will be thrown outwardly by centrifugal force into engagement with the lip 79 thereby releasing the disks 67 and 67x from frictional engagement and permitting rotation of the driving shaft and saw to cease.

Suitable means operable by movement of one of the handle members toward the saw is provided to cause frictional engagement of the clutch disks and which upon release of such pressure on the handle members will release the disks from frictional engagement. In the construction illustrated an antifriction thrust bearing 80 is interposed between the cylindrical head 77 and the collar 81. Both bearing and collar are free to rotate about the sleeve 75. The collar 81 is provided with oppositely extending radial pins 82 which extend through diametrically opposite slots 83 in the handle member 17 and are journaled in suitable bearings 84 (Fig. 7) in parallel legs 85 of the yoke-shaped portion 55 of the hand gripping member 47 which are pivotally mounted upon the shaft 56 in the boss 57 which extends downwardly from the handle member 17 as above described.

When therefore the hand gripping member 47 is pressed by the operator in a direction to force the saw against the work the sleeve 75 and its head 77 will be forced in that direction and the inclined surface 78 of the head 77 will crowd the balls 71 radially inwardly thereby forcing the disks 67 and 67x into frictional engagement and causing the rotation of the driving shaft 16. When the hand gripping member is moved sufficiently in the opposite direction the balls 71 will be forced outwardly by centrifugal force thereby releasing the clutch.

Where, as illustrated herein, the driving shaft 16 is driven by a flexible shaft from a motor which is stationary with respect to the portable saw mechanism the clutch shaft 64 desirably is provided with means such as an angular, preferably rectangular, end portion 86 which telescopically engages the complementary socket in a fitting 87 which preferably is mounted in antifriction bearings 88 in a casing 89 having a flange 90 which is bolted to a complementary flange 91 on the end of a tubular handle member 17.

The fitting 87 is fixedly secured to a flexible shaft 92 which is enclosed in a suitable flexible sheath 93 and as shown is driven from a countershaft which is actuated by suitable reducing gears 94 from the shaft 95 of a portable motor such as an internal combustion motor illustrated in Figs. 1 and 2, or any other type of motor including an electric motor.

Where the driving shaft 16 is actuated through the clutch shaft 64 from a motor mounted directly on the end of the handle member, as heretofore described, a suitable casing containing the motor and the necessary reduction gearings properly to drive a countershaft having a fitting for coupling it to the clutch shaft may be provided with means for securing the motor casing directly to the flange 91 on the end of the handle.

As illustrated in Fig. 10 an internal combustion motor, such as that shown in Figs. 1 and 2, is provided with a housing 96 enclosing the motor, its shaft 95 and the reducing gears 94 for driving the shaft 97 which actuates the clutch shaft with the shaft 64 projecting beyond the casing. The end of the countershaft 97 like that heretofore described is provided with a fitting having an angular, preferably rectangular, socket to fit the angular end portion of the clutch shaft. The housing 96 is provided with a tubular extension 98 which surrounds the shaft 97 and is provided with a flange 99 complementary to the flange 91 on the end of the handle member 17 and is secured thereto by equally spaced bolts or machine screws (as illustrated in Figs. 3 and 4).

Where the motor is thus mounted upon the end of the handle its weight serves to counterbalance the weight of the saw frame and saw when the assemblage is supported by the hand-gripping members, the motor of course being so positioned on the end of the handle as to be in a vertical position either when the saw frame is horizontal for cutting down a tree or when in a vertical position for sawing horizontal articles such as limbs, etc.

In the operation of the saw in felling a tree the saw is held by the operator in horizontal position with the right and left hands respectively gripping the hand grips 51 and 53. As the saw is moved toward the tree the natural movement of the hand which grasps the hand grip 53 moves it toward the tree and also toward the hand which grasps the hand grip 51. Such movement of the hand grip 53 causes longitudinal movement of the sleeve 75 in a direction to cause engagement of the clutch members and such engagement of the clutch members is maintained so long as the saw is pressed toward the tree to cut a slot into the same. When the saw is withdrawn from the tree the hand gripping member 53 is naturally moved in the opposite direction thereby releasing the clutch and permitting the rotation of the saw to cease. As a matter of fact release of pressure on the hand grip 53 at any time may not result in a release of the clutch members. The clutch is so constructed that the hand grip may be released at any time and the clutch will remain either engaged or disengaged dependent upon the position it happens to be in at that time, and further movement of the hand grip in a proper direction is required properly to engage or disengage the clutch.

In order to minimize the entrance of sawdust or chips into the chamber of the arcuate arms and thus interfering with the proper operation of the idle and driving gears the extensions 8 and 9 of the respective arcuate arms and also the complementary extensions of the supporting member are provided with detachable complementary guards 96 and 97 which engage opposite faces of the saw blade and are provided with complementary recesses 98 and 99 through which the teeth of the saw pass during its rotation.

While the invention as hereinbefore described comprises a thin annular circular saw blade having external peripheral teeth a saw blade having internal teeth may be employed. Such a saw is illustrated in Fig. 9 and comprises semi-circular saw sections 100 and 101 which are provided with internal saw teeth 102. The saw sections 100 and 101 are provided with overlapping portions which are pivotally secured together by a pin or rivet 103 and the diametrically opposite abutting ends of the saw blade are provided respectively with a spring latch 104 adapted to engage a complementary recess 105 in the other section. The blade is provided with a circular series of narrowly spaced slots 106 adapted to be engaged by the driving gear 20, as heretofore described.

When a saw of this character is to be used the section which is not engaged by the gear 20 is unlatched and swung about the pivot 103 to enable the work to be inserted in the then open saw. After such insertion the saw section which has thus been swung open is returned to and latched in operative position to the other saw section and the saw blade rotated in the manner heretofore described. In this construction, as in the other, the engagement of the root portions of the gear teeth 20 absorb the thrust of the saw as the handle member is pulled away from the work instead of being pressed toward it as will be readily understood by those skilled in the art.

By reason of the construction above described and the positioning of the hand grips 51, 52, and 53, 54, at right angles to each other, the saw can be readily held by the operator either in a horizontal position, a vertical position, or in any angularly rotated position with respect to the axis of the driving shaft and may be tilted in any direction to the vertical which may be desirable to produce a proper cut upon the work, such for example as a downwardly extending diagonal cut to meet a horizontal cut previously made in the tree for producing a notch which will determine the direction in which the tree was falling, or in any position which may be required properly to sever a limb from the tree or to make a desired cut in any piece of work irrespective of its position.

While the hand gripping members illustrated and described herein are provided with handles extending at right angles to each other, it will be obvious that adjustable hand gripping members may be so secured to the handle member 17 as properly to hold the saw in any desired radial position with respect to the axis of the driving shaft 16.

It will be understood that the preferred embodiment of the invention disclosed herein is of an illustrative character and not restrictive of the meaning and scope of the following claims.

Having thus described the invention, what is claimed as new and desired to be secured by Letters Patent is:

1. A circular saw comprising a flat annular saw blade having intermediate of its width a circular series of uniform narrowly spaced gear-teeth-receiving recesses with inner walls substantially concentric with the axis of rotation of the saw blade, a frame having a head with oppositely extending portions enclosing a semi-circular segment of the blade, means for maintaining the blade accurately in its plane of rotation, means for driving the blade, thrust-resisting gears spaced substantially less than 180° apart around the enclosed segment of the blade and rotatable about axes in radial alinement with and perpendicular to the axis of rotation of the blade and having teeth provided with faces to engage the inner walls of said recesses cooperating to resist the force resulting from the action of the exposed active cutting portion of the blade of the saw upon the work produced by manually applied thrust of the saw toward the work.

2. A circular saw comprising a flat annular saw blade having intermediate of its width a circular series of uniform narrowly spaced gear-teeth-receiving recesses with parallel inner and outer walls substantially concentric with the axis of rotation of the saw blade, a frame having a head with oppositely extending portions enclosing a semi-circular segment of the blade, saw-supporting means pivotally mounted on said head, means for releasably connecting said saw-supporting means to said frame, cooperating means on said frame and said saw-supporting means to maintain the blade accurately in its plane of rotation, means for driving the blade, thrust-resisting gears mounted on said frame and spaced substantially less than 180° apart around the enclosed segment of the blade and rotatable about axes in radial alinement with and perpendicular to the axis of rotation of the blade and having teeth provided with faces adapted to engage said walls of said recesses cooperating to resist the force resulting from the action of the exposed active cutting portion of the blade of the saw upon the work produced by manually applied thrust of the saw toward the work.

3. In a circular saw comprising a flat annular saw blade having intermediate of its width a circular series of uniform narrowly substantially rectangular gear-teeth-receiving recesses having inner and outer walls substantially concentric with the axis of rotation of the saw blade, a frame having a head with oppositely extending portions enclosing a semi-circular segment of the blade, a driving shaft mounted on said head in radial alinement with and perpendicular to the axis of rotation of the blade, a gear secured to said shaft having teeth meshing with said recesses in the blade, handle means extending outwardly and radially of said frame and blade as well as parallel with said driving shaft for pressing the saw against the work in the axial direction of the driving shaft, thrust resisting gears mounted on said frame on opposite sides of said driving gear spaced substantially less than 180° apart around the enclosed segment of said saw blade having teeth meshing with said recesses in the saw blade and having faces to engage the inner and outer walls of said recesses cooperating to resist the force resulting from manually applied force pressing the saw toward the work and the force resulting from the action of the exposed active cutting portion of the blade of the saw upon the work and cooperating anti-friction means for maintaining the saw accurately in the plane of its rotation.

4. A circular saw comprising a flat annular saw blade having intermediate of its width a circular series of uniform narrowly spaced substantially rectangular gear-teeth-receiving recesses having inner walls substantially concentric with the axis of rotation of the saw blade, a frame having a head with oppositely extending arms enclosing a substantial segment of the blade, a driving shaft mounted centrally on said head in radial alinement with and perpendicular to the axis of rotation of the blade, a driving gear secured to said said shaft having teeth with parallel walls at the pitch line meshing with the recesses in said blade and provided with end faces adapted to engage the inner walls of the respective recesses in the blade, gears mounted on said frame around the enclosed segment of said saw blade and on opposite sides of said driving gear at substantially equal distances therefrom and rotatable about axes in radial alinement with and perpendicular to the axis of rotation of the blade cooperating to resist the force of the saw resulting from the action of the exposed active cutting portion of the blade of the saw upon the work, and means for maintaining the saw accurately in its plane of rotation, and means for pressing the saw against the work in the axial direction of the driving shaft.

5. A portable power actuated saw comprising a flat annular saw blade having intermediate of its width a circular series of uniform narrowly spaced substantially rectangular gear-teeth-receiving recesses having walls substantially concentric with the axis of rotation of the saw blade, a frame having a head with oppositely extending arcuate arms enclosing approximately one-half the circumference of the blade and having diverging extensions projecting beyond the periphery of the blade, a driving shaft mounted centrally on said head in radial alinement with and perpendicular to the axis of rotation of the blade and extending outwardly beyond said head, a gear fixedly secured to said shaft having teeth meshing with the recesses in said blade, thrust-resisting gears spaced substantially less than 180° apart around the blade mounted on said arms on opposite sides of said driving shaft cooperating to resist opposing sawing force on the exposed active cutting portion of the saw blade, and means adapted to be engaged by the operator for forcing the saw against the work, a saw-supporting member pivotally mounted on said head having arcuate arms complementary to those of said head, a pivotally mounted guiding arm extending along and in parallelism with the arm of the frame toward which the teeth of the saw move when cutting and well beyond the periphery of the blade, means for adjusting the guiding arm relatively to the axis of rotation of the saw properly to position the saw for cutting work of different dimensions, and means adapted to be grasped by the operator for forcing the saw against the work.

6. A circular saw comprising a flat annular saw blade having intermediate of its width a circular series of uniform narrowly spaced substantially rectangular gear-teeth-receiving recesses having inner walls substantially concentric with the axis of rotation of the saw blade, a frame having a head with oppositely extending arcuate arms enclosing a segment of approximately one-half the circumference of the blade, a driving shaft journaled centrally on said head in radial alinement with and perpendicular to the axis of rotation of the blade and extending outwardly from said head, a gear fixedly secured to said shaft having teeth meshing with the recesses in said blade, thrust-resisting gears provided with end faces adapted to engage the inner and outer walls of the respective recesses in the blade, said thrust-resisting gears being spaced substantially less than 180° apart around the blade mounted on said arms on opposite sides of said driving shaft cooperating to resist the opposing sawing force on the exposed active cutting portion of the saw blade, and means adapted to be engaged by the operator for forcing the saw against the work, means for maintaining the saw accurately in its plane of rotation, a tubular handle member rigid with said frame enclosing the extension of said driving shaft, a motor driven clutch shaft journaled in said tubular handle member having a frictional clutch releasably connecting it to said driving shaft, a hand gripping member fixedly secured to said tubular member in proximity to said head, a cooperating hand gripping member suitably spaced therefrom pivotally mounted on said tubular member having means engaging said clutch and operable by the natural pressure on the hand gripping member when the saw is moved to and maintained in engagement with the work to cause driving engagement of the clutch and upon release of such pressure to enable the clutch members to remain in frictional engagement or to disengage the clutch depending upon the position to which the clutch-actuating hand grip is moved.

HENRY A. CHASE.

REFERENCES CITED

The following references are of record in the file of this patent:

UNITED STATES PATENTS

| Number | Name | Date |
|---|---|---|
| 423,278 | Robison | Mar. 11, 1890 |
| 530,791 | Newton | Dec. 11, 1894 |
| 773,118 | Carter | Oct. 25, 1904 |
| 1,234,690 | Pieper | July 24, 1917 |
| 1,342,213 | Hanson et al. | June 1, 1920 |
| 1,388,186 | McCormick | Aug. 23, 1921 |
| 1,503,723 | Strom | Aug. 5, 1924 |
| 1,507,245 | Nankivell | Sept. 2, 1924 |
| 1,520,330 | Chinn | Dec. 23, 1924 |
| 1,588,744 | Keane | June 15, 1926 |
| 1,616,880 | Swanstrom | Feb. 8, 1927 |
| 2,091,827 | Mercatoris | Aug. 31, 1927 |

FOREIGN PATENTS

| Number | Country | Date |
|---|---|---|
| 118,846 | Great Britain | Aug. 14, 1919 |
| 402,765 | Great Britain | Nov. 28, 1933 |

Certificate of Correction

Patent No. 2,490,255                                                               December 6, 1949

HENRY A. CHASE

It is hereby certified that error appears in the printed specification of the above numbered patent requiring correction as follows:

Column 10, line 13, after the word "narrowly" insert *spaced*;

and that the said Letters Patent should be read with this correction therein that the same may conform to the record of the case in the Patent Office.

Signed and sealed this 11th day of April, A. D. 1950.

[SEAL]

THOMAS F. MURPHY,
*Assistant Commissioner of Patents.*